(12) United States Patent
Chen et al.

(10) Patent No.: US 8,914,197 B2
(45) Date of Patent: *Dec. 16, 2014

(54) WINDSHIELD WIPER CONTROLLER, OPTICAL RAINDROP DETECTOR AND DETECTION METHOD THEREOF

(71) Applicant: PixArt Imaging Inc., Hsin-Chu County (TW)

(72) Inventors: Hsin-Chia Chen, Hsin-Chu (TW);
Horng-Goung Lai, Hsin-Chu (TW);
Feng-Cheng Yang, Hsin-Chu (TW);
Hui-Hsuan Chen, Hsin-Chu (TW);
Ching-Lin Chung, Hsin-Chu (TW);
Ming-Tsan Kao, Hsin-Chu (TW)

(73) Assignee: PixArt Imaging Inc., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 13/837,518

(22) Filed: Mar. 15, 2013

(65) Prior Publication Data

US 2013/0275007 A1 Oct. 17, 2013

(30) Foreign Application Priority Data

Apr. 13, 2012 (TW) .............................. 101113145 A (51) Int. Cl.
*B60S 1/08* (2006.01)
*G06K 9/00* (2006.01)
*G06K 9/20* (2006.01)

(52) U.S. Cl.
CPC .............. *B60S 1/0833* (2013.01); *Y10S 318/02* (2013.01); *B60S 1/0844* (2013.01); *G06K 9/00791* (2013.01); *G06K 9/00832* (2013.01); *G06K 9/209* (2013.01)
USPC ......... 701/49; 250/574; 356/239.8; 73/29.05; 318/DIG. 2

(58) Field of Classification Search
CPC .... B60S 1/0833; B60S 1/0844; B60S 1/0837; G06K 9/00; G06K 9/2009; Y10S 318/02
See application file for complete search history.

(56) References Cited

U.S. PATENT DOCUMENTS

| | | | | |
|---|---|---|---|---|
| 6,020,704 | A | * | 2/2000 | Buschur ......................... 318/483 |
| 6,153,995 | A | * | 11/2000 | Tanaka .......................... 318/483 |
| 6,429,933 | B1 | * | 8/2002 | Jackson, Jr. ................. 356/239.8 |
| 7,259,367 | B2 | * | 8/2007 | Reime ....................... 250/227.25 |
| 2002/0148986 | A1 | * | 10/2002 | Hochstein ...................... 250/573 |
| 2005/0035926 | A1 | * | 2/2005 | Takenaga et al. .................. 345/8 |
| 2006/0215164 | A1 | * | 9/2006 | Takata et al. .................. 356/445 |
| 2006/0221342 | A1 | * | 10/2006 | Saikalis et al. ................ 356/445 |
| 2013/0215257 | A1 | * | 8/2013 | Huang et al. .................... 348/86 |
| 2013/0222346 | A1 | * | 8/2013 | Chen et al. .................... 345/175 |

* cited by examiner

*Primary Examiner* — Michael J Zanelli
(74) *Attorney, Agent, or Firm* — Lowe Hauptman & Ham, LLP (57) ABSTRACT

There is provided an optical raindrop detector including a light source, a light guide, an image sensor and a processing unit. The light source alternatively emits light with different brightness values. The light guide has an incident surface, a detection surface and an ejection surface, wherein the light source emits incident light into the light guide via the incident surface, and a plurality of microstructures are formed on the ejection surface to reflect the incident light to become scattered light toward the detection surface. The image sensor receives reflected light formed by raindrops in front of the detection surface reflecting the scattered light to penetrate the light guide and eject from the ejection surface, and generates image frames corresponding to the different brightness values of the light source. The processing unit calculates differential images of the image frames to accordingly identify rain intensity.

20 Claims, 5 Drawing Sheets


WINDSHIELD WIPER CONTROLLER, OPTICAL RAINDROP DETECTOR AND DETECTION METHOD THEREOF

CROSS REFERENCE TO RELATED APPLICATION

This application claims the priority benefit of Taiwan Patent Application Ser. No. 101113145, filed on Apr. 13, 2012, the full disclosure of which is incorporated herein by reference.

BACKGROUND

1. Field of the Disclosure

This disclosure generally relates to an active control system and, more particularly, to a windshield wiper controller, an optical raindrop detector and a detection method thereof for vehicles.

2. Description of the Related Art

The wiper for vehicles is used to remove the dust and water attached to the windshield of car so as to provide a clear view to the driver. Conventional windshield wipers are manually controlled by a driver through a switching device to change the wiping frequency and the wiping speed according to the actual clearness of view. Using hits way, the concentration of the driver can be distracted in driving.

In order to increase the driving safety and make the vehicle equipment more user-friendly, an auto wiper control system gradually becomes standard equipment in a vehicle. Conventional auto wiper control systems can automatically determine the wiping frequency of a wiper according to the driving speed or the rainfall amount. As the auto wiper control system based on driving speed does not determine the wiping speed of the wiper according to an actual rainfall amount, it has low control accuracy.

Generally an auto wiper control system based on rainfall amount may include an optical, a conductive, a capacitive, a piezoelectric or an audio raindrop sensor configured to detect rainfall amount. As the optical raindrop sensor is not easy to be disturbed, it is broadly used in various vehicles.

Accordingly, the present disclosure further provides a windshield wiper controller, an optical raindrop detector and a detection method thereof that may identify rain intensity by analyzing the intensity variation of every pixel in image frames captured by an image sensor to accordingly control the motion of a wiper.

SUMMARY

The present disclosure provides a windshield wiper controller, an optical raindrop detector and a detection method thereof that may eliminate the interference from ambient light by calculating differential images thereby improving the identification accuracy.

The present disclosure further provides a windshield wiper controller, an optical raindrop detector and a detection method thereof that may identify rain intensity according to the intensity variation of every pixel between differential images to accordingly control a wiping frequency and a wiping speed of a wiper.

The present disclosure provides an optical raindrop detector including a light source, a light control unit, a light guide, an image sensor and a processing unit. The light control unit is configured to control the light source to emit light with a first brightness value and a second brightness value. The light guide has an incident surface, a detection surface and an ejection surface, wherein the light source emits incident light into the light guide via the incident surface and a plurality of microstructures are formed on the ejection surface to reflect the incident light to become scattered light toward the detection surface. The image sensor is configured to receive reflected light formed by raindrops, which are in front of the detection surface, reflecting the scattered light to penetrate the light guide and eject from the ejection surface, and to generate a first image frame corresponding to the first brightness value and a second image frame corresponding to the second brightness value. The processing unit is configured to calculate a differential image of the first image frame and the second image frame and to identify rain intensity according to the differential image.

The present disclosure further provides a windshield wiper controller adapted to be disposed on an inner surface of a windshield. The windshield wiper controller includes a light source, a light control unit, a light guide, an image sensor, a processing unit and a control unit. The light control unit is configured to control the light source to emit light with a first brightness value and a second brightness value. The light guide has an incident surface, a detection surface and an ejection surface, wherein the detection surface is configured to be attached to the inner surface, and the light source emits incident light into the light guide via the incident surface and a plurality of microstructures are formed on the ejection surface configured to reflect the incident light to become scattered light toward the detection surface. The image sensor is configured to receive reflected light formed by raindrops, which are outside the windshield, reflecting the scattered light to penetrate the light guide and eject from the ejection surface and to generate a first image frame corresponding to the first brightness value and a second image frame corresponding to the second brightness value. The processing unit is configured to calculate a differential image of the first image frame and the second image frame and to output a wiper control signal according to the differential image. The control unit is configured to control a wiper according to the wiper control signal.

The present disclosure further provides a detection method of an optical raindrop detector. The optical raindrop detector includes a light source, a light guide, an image sensor and a processing unit. The light guide has an incident surface, a detection surface and an ejection surface and a plurality of microstructures are formed on the ejection surface. The detection method includes the steps of: controlling the light source to emit light with a first brightness value and a second brightness value; using the image sensor to capture, at a sampling frequency, reflected light formed by raindrops, which are in front of the detection surface, reflecting scattered light, which is formed by the microstructures reflecting incident light emitted by the light source into the light guide and ejecting from the detection surface, to penetrate the light guide and eject from the ejection surface to generate a first image frame corresponding to the first brightness value and a second image frame corresponding to the second brightness value; using processing unit to calculate a differential image of the first image frame and the second image frame; and using the processing unit to compare the differential image with an intensity threshold to identify rain intensity.

In the windshield wiper controller, the optical raindrop detector and the detection method according to the embodiment of the present disclosure, the second brightness value is smaller than the first brightness value and the second brightness value may be zero brightness or non-zero brightness.

In the windshield wiper controller, the optical raindrop detector and the detection method according to the embodiment of the present disclosure, the processing unit further calculates a pixel number of pixels having intensity values larger than an intensity threshold in the differential image and calculates a variation value of the pixel number in successive differential images; and the processing unit determines the rain intensity according to a sum or an average of the variation value of a predetermined number of the differential images. Or, the processing unit further calculates a total pixel area of pixels having intensity values larger than an intensity threshold in the differential image and determines the rain intensity according to a sum or an average of the total pixel area of a predetermined number of the differential images. This embodiment is configured to detect the rainfall amount outside the windshield.

In the windshield wiper controller, the optical raindrop detector and the detection method according to the embodiment of the present disclosure, the processing unit further calculates a fixed object area of pixels having intensity values larger than an intensity threshold in the differential image and outputs a wiper trigger signal when the fixed object area is larger than an area threshold. This embodiment is configured to detect the fixed spot attached on the windshield. It is appreciated that this embodiment may also be configured to detect the rainfall amount outside the windshield as the previous embodiment.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
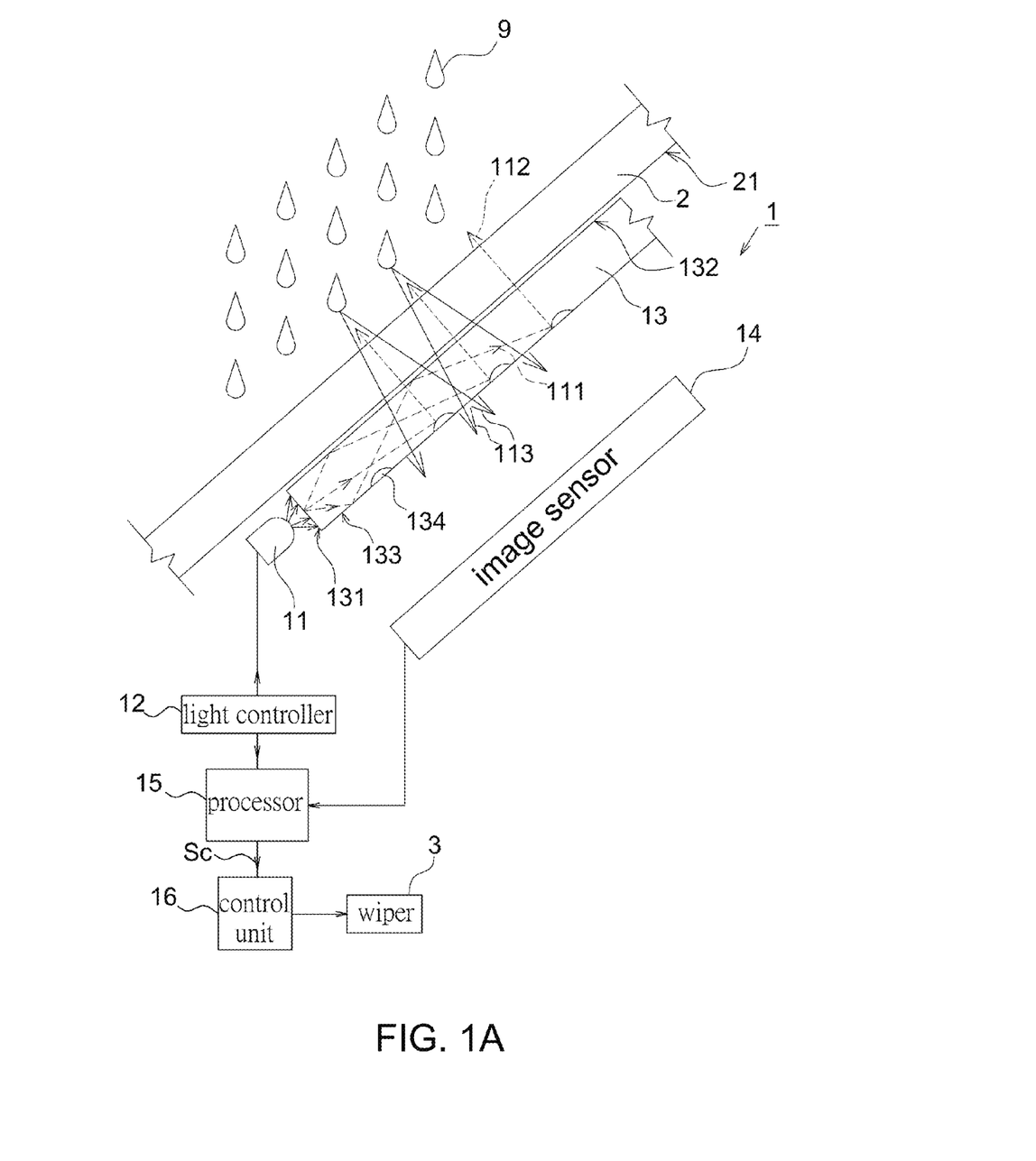
FIGS. 1A and 1B show schematic diagrams of the optical raindrop detector according to the embodiment of the present disclosure.
Figure 1B:
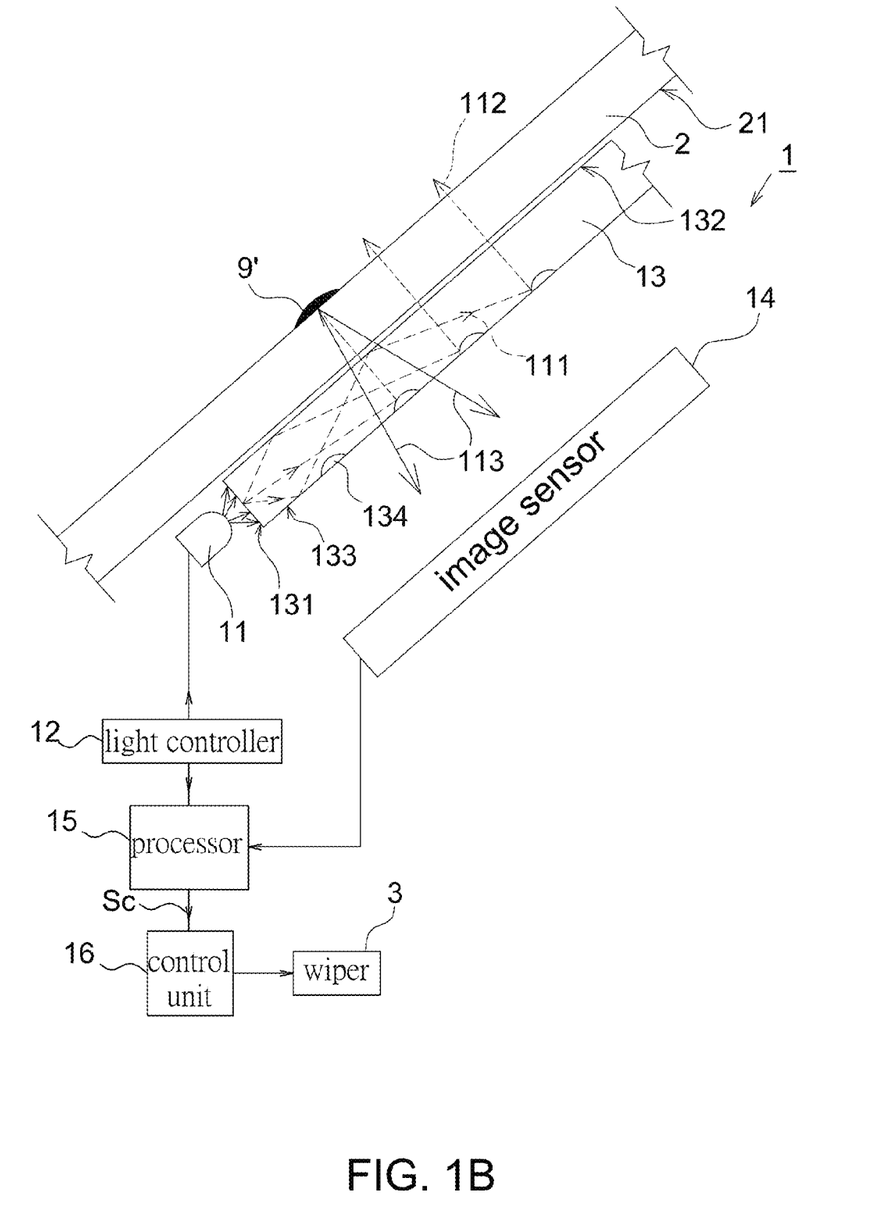

Referring to FIGS. 1A and 1B, FIG. 1A shows a schematic diagram of the detection of raindrops 9 with the optical raindrop detector and the windshield wiper controller according to an embodiment of the present disclosure; and FIG. 1B shows a schematic diagram of the detection of a spot 9' attached to the surface of a windshield 2 with the optical raindrop detector and the windshield wiper controller according to an embodiment of the present disclosure, wherein the spot 9' may be any object such as dust, water, oil and the like that is on a line of sight of a driver. The optical raindrop detector and the windshield wiper controller 1 of this embodiment may be disposed on an inner surface 21 of a windshield 2 of a vehicle, and preferable tightly attached to the inner surface 21 of the windshield 2 configured to detect a number or an area of an object (e.g. the raindrop 9 and/or the spot 9') thereby identifying rain intensity to accordingly output a wiper control signal Sc so as to relatively control a wiping speed and a wiping frequency of a wiper 3. It is appreciated that the wiper 3 is generally driven by a motor to move to and fro on the windshield 2 for cleaning the spot 9' thereon, wherein the technique of driving a wiper by the motor is well known to the art and details thereof are not described herein.

The raindrop detector 1 of this embodiment includes a light source 11, a light control unit 12, a light guide 13, an image sensor 14 and a processing unit 15, and if a control unit 16 is further included, it is able to form the windshield wiper controller according to the embodiment of the present disclosure which is adapted to control the motion of a wiper 3. In other words, the windshield wiper controller of the present embodiment includes the light source 11, the light control unit 12, the light guide 13, the image sensor 14, the processing unit 15 and the control unit 16. In this embodiment, the light control unit 12 and/or the control unit 16 may be included in the processing unit 15 or independent therefrom without any limitation. The light guide 13 is configured to convert the incident light emitted by the light source 11 to propagate toward the windshield 2 and eject therefrom so as to illuminate the object 9' on the windshield 2 and/or the object 9 in front of the windshield 2. It is appreciated that a ratio of the thicknesses of the windshield 2 and the light guide 13 shown in FIGS. 1A and 1B is only exemplary.

The light source 11 is preferably a light emitting diode and configured to emit, for example, red light, infrared light or other invisible light. The light source 11 is configured to emit incident light 111 into the internal of the light guide 13 via an incident surface 131 of the light guide 13. If the total reflection condition is satisfied, the incident light 111 can propagate in a direction away from the incident surface 131. In other words, the light source 11 may be disposed opposite to the incident surface 131.

Figure 2:
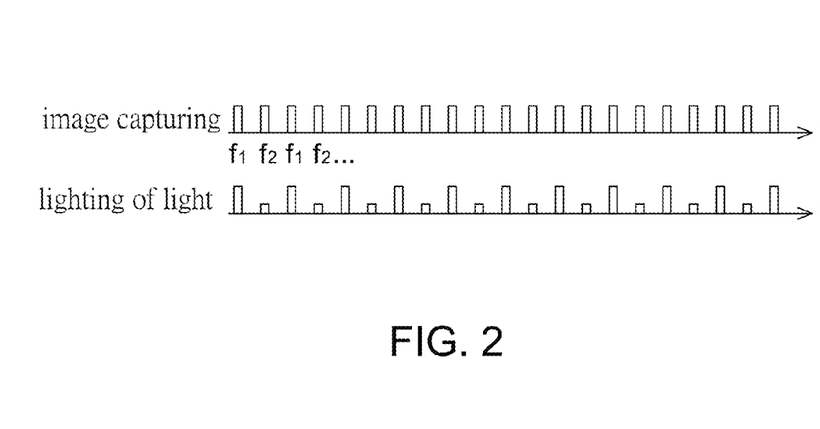
FIG. 2 shows a schematic diagram of the image capturing and the lighting of the light source in the optical raindrop detector according to the embodiment of the present disclosure.

The light control unit 12 is configured to control the light source 11 to emit light alternatively in a first brightness value and a second brightness value. The purpose of controlling the light source 11 to emit light with different brightness values is to eliminate the interference from ambient light by calculating differential images in the post-processing (described later). The light control unit 12 may be controlled by the processing unit 15 to have the light source 11 emit light synchronizing to the image capturing of the image sensor 14 as shown in FIG. 2 for example.

The light guide 13 may be made of proper material that is transparent to the light emitted by the light source 11 such as glass, plastic or epoxy, but not limited thereto. The light guide 13 has the incident surface 131, a detection surface 132 and an ejection surface 133, wherein the detection surface 132 is opposite to the ejection surface 133. When the optical raindrop detector (or the windshield wiper controller) 1 is disposed on the inner surface 21 of the windshield 2, the detection surface 132 is preferably tightly attached to the inner surface 21. The object 9, 9' is located on a side of the detection surface 132, i.e. outside the windshield 2. In this embodiment, a plurality of microstructures 134 are formed on the ejection surface 133 of the light guide 13, wherein the microstructures 134 may have any shape and may be convexes, irregularities or concaves formed by printing, spraying, etching, atomising or pressing process without any limitation as long as they are able to reflect the incident light 111 emitted by the light source 11. The microstructures 134 are configured to reflect the incident light 111 to become scattered light 112 propagating toward the detection surface 132 and ejecting from the light guide 13 and the windshield 2. The scattered light 112 is reflected by the object 9, 9' in front of the detection surface 132 (i.e. outside the windshield 2) to become reflected light 113. And the reflected light 113 passes through the windshield 2 and the light guide 13 again and ejects from the ejection surface 133. In this embodiment, a ratio of the total area of the microstructures 134 and the total area of the ejection surface 133 is preferably between 10%-90% so that the microstructures 134 may reflect enough incident light 111 and allow enough reflected light 113 to pass through the ejection surface 133.

The image sensor 14 may be a CCD image sensor, a CMOS image sensor or other sensor capable of detecting light energy. The image sensor 14 is disposed at a side of the ejection surface 133 to receive and capture, at a sampling frequency, the reflected light 113 ejected from the ejection surface 133 and to generate a first image frame $f_1$ corresponding to the first brightness value of the light source 11 and a second image frame $f_2$ corresponding to the second brightness value of the light source 11 (as shown in FIG. 2). The first image frame $f_1$ and the second image frame $f_2$ are sent to the processing unit 15 for post-processing.

The processing unit 15 is configured to calculate a differential image $(f_1-f_2)$ of the first image frame $f_1$ and the second image frame $f_2$ and to identify rain intensity according to the differential image $(f_1-f_2)$ to accordingly output a wiper control signal Sc, wherein the wiper control signal Sc may include a wiper speed signal and a wiper trigger signal. The wiper speed signal may determine a wiping speed and a wiping frequency of the wiper 3; and the wiper trigger signal is configured to enable the wiper 3 with a predetermined speed and a predetermined wiping times.

The control unit 16 is configured to control the motion, e.g. the wiping speed and the wiping frequency, of the wiper 3 according to the wiper control signal Sc.

Figure 3:
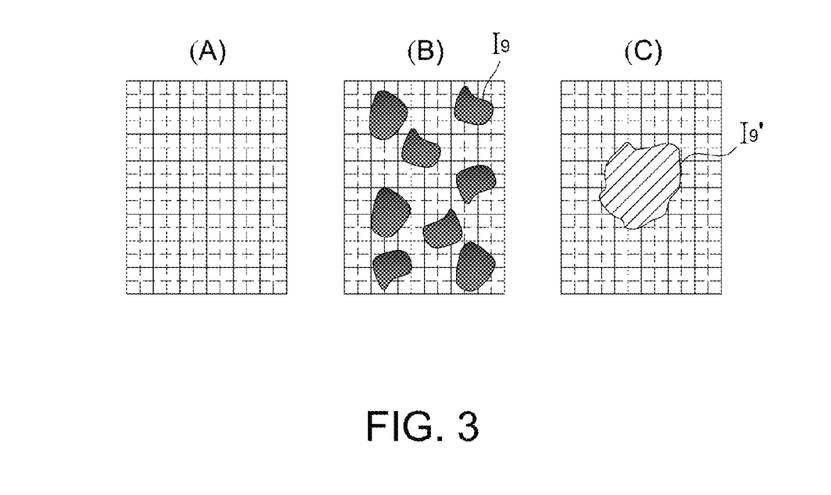
FIG. 3 shows a schematic diagram of image frames captured by the image sensor in the optical raindrop detector according to the embodiment of the present disclosure.
Figure 4A:
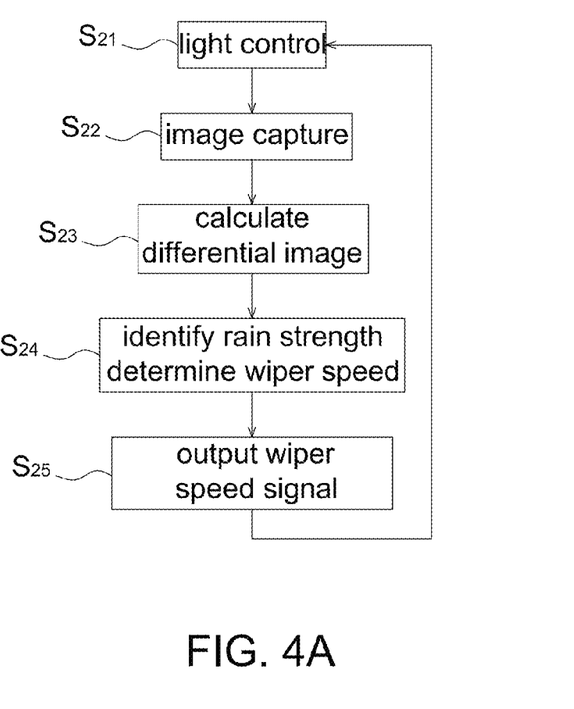
FIG. 4A shows a flow chart of the detection method of the optical raindrop detector according to an embodiment of the present disclosure.
Figure 4B:
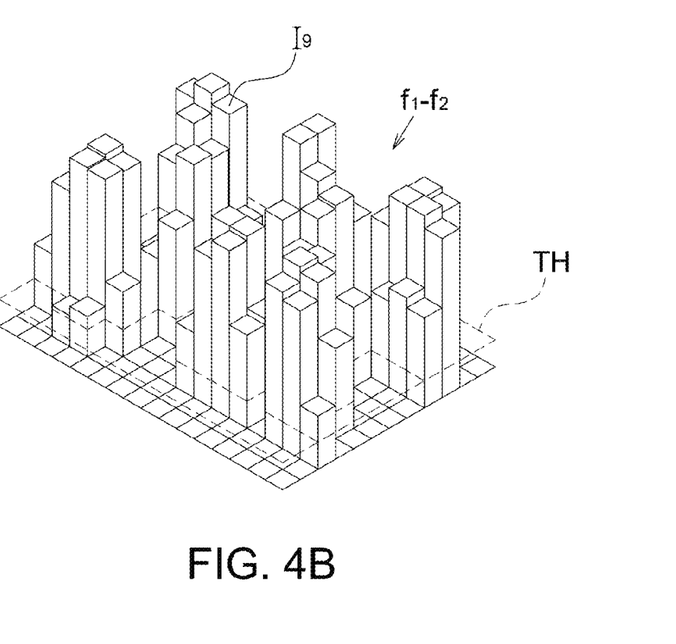
FIG. 4B shows a schematic diagram of the pixel intensity of the differential image and an intensity threshold in the optical raindrop detector according to the embodiment of the present disclosure.

Referring to FIGS. 1A, 2, 3, 4A and 4B, FIG. 2 shows an operational schematic diagram of the image capturing and the lighting of the light source in the optical raindrop detector (or windshield wiper controller) according to the embodiment of the present disclosure; FIG. 3 shows a schematic diagram of image frames captured by the image sensor in the optical raindrop detector (or windshield wiper controller) according to the embodiment of the present disclosure; FIG. 4A shows a flow chart of the detection method of the optical raindrop detector according to an embodiment of the present disclosure; and FIG. 4B shows a schematic diagram of every pixel intensity in the differential image and an intensity threshold in the optical raindrop detector (or windshield wiper controller) according to the embodiment of the present disclosure, wherein FIG. 4B is corresponded to FIG. 3(B).

The detection method of this embodiment includes the steps of: controlling a light source to emit light with a first brightness value and a second brightness value (Step $S_{21}$); using an image sensor to capture reflected light ejecting from an ejection surface at a sampling frequency and to generate a first image frame corresponding to the first brightness value and a second image frame corresponding to the second brightness value (Step $S_{22}$); using a processing unit to calculate a differential image of the first image frame and the second image frame (Step $S_{23}$); using the processing unit to identify rain intensity according to the differential image to accordingly determine a wiper speed (Step $S_{24}$); and outputting a wiper speed signal with the processing unit (Step $S_{25}$).

At first, the light control unit 12 controls the light source 11 to emit light with a first brightness value (e.g. rectangles having a longer length in FIG. 2) and a second brightness value (e.g. rectangles having a shorter length in FIG. 2) so as to emit incident light 111 into the internal of the light guide 13 via the incident surface 131 and the incident light 111 may propagate in a direction away from the incident surface 131 (Step $S_{21}$) inside the light guide 13, wherein the second brightness value may be zero brightness or non-zero brightness.

Next, the image sensor 14 captures, at a sampling frequency shown as the image capturing in FIG. 2, reflected light 113 formed by the object 9, 9' in front of the detection surface 132 (i.e. outside the windshield 2) reflecting scattered light 112, which is formed by the microstructures 134 reflecting incident light 111 emitted by the light source 11 into the light guide 11 and ejecting from the detection surface 132 (and the windshield 2), to penetrate the light guide 13 and eject from the ejection surface 133 to generate a first image frame $f_1$ corresponding to the first brightness value and a second image frame $f_2$ corresponding to the second brightness value, wherein since the first brightness value is larger than the second brightness value, an average intensity of the first image frame $f_1$ is larger than an average intensity of the second image frame $f_2$ (Step $S_{22}$). For example FIG. 3(A) shows that the image frame captured by the image sensor 14 does not contain any raindrop or spot; FIG. 3(B) shows that the image frame contains a plurality of raindrop images $I_9$ (e.g. corresponding to FIG. 1A); and FIG. 3(C) shows that the image frame contains a spot image $I_9'$ (e.g. corresponding to FIG. 1B).

The processing unit calculates a differential image $(f_1-f_2)$ of the first image frame $f_1$ and the second image frame $f_2$, wherein as every image frame $f_1$, $f_2$ captured by the image sensor 14 contains ambient light, it is able to effectively eliminate the interference from ambient light by calculating the differential image $(f_1-f_2)$ and only the intensity component associated with the object image in every pixel will be left in the differential image as shown in FIG. 4B. In this manner, it is able to improve the identification accuracy (Step $S_{23}$).

The processing unit 15 compares the differential image $(f_1-f_2)$ with an intensity threshold TH so as to identify rain intensity. For example in FIG. 4B, when the intensity of at least a part of pixels of the differential image $(f_1-f_2)$ is larger than the intensity threshold TH, it means that at least a raindrop 9 or a spot 9' is at the side of the detection surface 132; on the contrary, when the pixel intensity of all pixels of the differential image $(f_1-f_2)$ is smaller than the intensity threshold TH, it means that no raindrop 9 or spot 9' exists at the side of the detection surface 132. In this embodiment, for example it is able to define a digit number "1" or "0" to indicate an intensity of one pixel if the intensity of that pixel is larger than the threshold value TH and define a digit number "0" or "1" to indicate an intensity of one pixel if the intensity of that pixel is smaller than the threshold value TH.

For example in one embodiment, the processing unit 15 may calculate a pixel number of pixels having intensity values larger than the intensity threshold TH in the differential image $(f_1-f_2)$ and calculate a variation value of the pixel number (e.g. a number of pixels changing from "1" to "0", from "0" to "1" or a sum of the number of pixels changing from "1" to "0" and from "0" to "1") in successive image frames $(f_1-f_2)$. If the variation value is higher, it means that the rain intensity is larger; on the contrary, if the variation value is lower, it means that the rain intensity is smaller. The processing unit 15 may determine the rain intensity according to a sum or an average of the variation value of a predetermined number (e.g. 10 image frames, but not limited to) of the differential image frames ($f_1-f_2$) (Step $S_{24}$).

In another embodiment, the processing unit 15 may calculate a total pixel area of pixels having intensity values larger than the intensity threshold TH in the differential image ($f_1-f_2$) and determine the rain intensity according to the total pixel area; that is, if the total pixel area is higher, it means that the rain intensity is larger; on the contrary, if the total pixel area is lower, it means that the rain intensity is smaller. In addition, the processing unit 15 may determine the rain intensity according to a sum or an average of the total pixel area of a predetermined number (e.g. 10 differential image frames, but not limited to) of the differential images ($f_1-f_2$) (Step $S_{24}$).

Finally, the processing unit 15 determines and outputs a wiper speed signal according to the rain intensity determined in the Step $S_{24}$ to the control unit 16. The control unit 16 may correspondingly control the wiping speed and/or wiping frequency of the wiper 3 according to the wiper speed signal. The present embodiment is configured to detect the raindrop 9 having a varying position with time on the windshield 2 or in front of the windshield 2, wherein a distance of the raindrop from the windshield 2 that is detectable by the optical raindrop detector 1 may be determined according to the first brightness value of the light source 11.

Refer to FIGS. 1B, 2, 3 and 5, FIG. 5 shows a flow chart of the detection method of the optical raindrop detector according to another embodiment of the present disclosure. The detection method of this embodiment includes the steps of: controlling a light source to emit light with a first brightness value and a second brightness value (Step $S_{31}$); using an image sensor to capture reflected light ejecting from an ejection surface at a sampling frequency and to generate a first image frame corresponding to the first brightness value and a second image frame corresponding to the second brightness value (Step $S_{32}$); using a processing unit to calculate a differential image of the first image frame and the second image frame (Step $S_{33}$); using the processing unit to compare an object area with an area threshold (Step $S_{34}$); and outputting a wiper trigger signal with the processing unit (Step $S_{35}$). This embodiment is configured to detect a spot 9' attached to the windshield 2 (as shown in FIGS. 1B and 3(C)), wherein the Steps $S_{31}$~$S_{33}$ are identical to the Steps $S_{21}$~$S_{23}$ and thus details thereof are not repeated therein.

Figure 5:
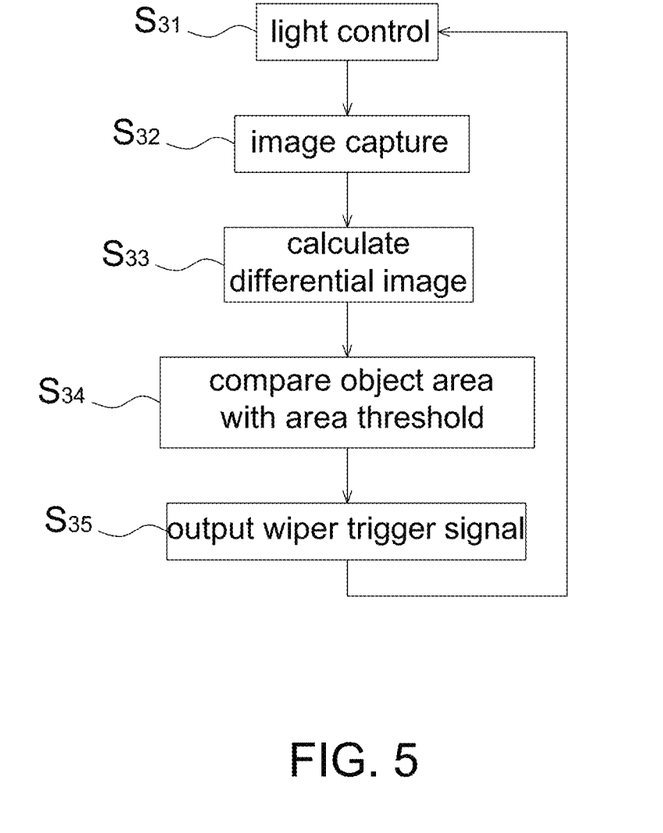
FIG. 5 shows a flow chart of the detection method of the optical raindrop detector according to another embodiment of the present disclosure.

When obtaining the differential image ($f_1-f_2$), the processing unit 15 calculates a fixed object area (e.g. the area of the spot image $I_9'$) of pixels having intensity values larger than an intensity threshold in the differential image ($f_1-f_2$) and compares the fixed object area with an area threshold (Step $S_{34}$).

The processing unit 15 finally outputs a wiper trigger signal according to the fixed object area. For example, when the fixed object area is larger than the area threshold, it means that the spot 9' attached to the windshield 2 may block the line of sight of a driver so that the processing unit 16 outputs a wiper trigger signal to the control unit 16 to control the motion of the wiper 3. In this embodiment, it is able to select a proper pixel area to be served as the area threshold, such as 10 pixels, but not limited to. The control unit 16 may control the wiper 3 to clear the spot 9' attached to the windshield 2 with a predetermined speed and a predetermined wiping times according to the wiper trigger signal, wherein the predetermined speed and the predetermined wiping times do not have any limitation.

It is appreciated that as long as the steps of FIGS. 4A and 5 are built-in the processing unit 16, the detection methods of FIG. 4A and FIG. 5 can be performed simultaneously. In other words, the optical raindrop detector and the windshield wiper controller may be configured to detect a moving object 9 and a fixed object 9'.

It should be mentioned that in this embodiment the intensity threshold and the area threshold may be determined according to actual requirements without any limitation, such as determined by the detection accuracy.

As mentioned above, it is already known that in an auto wiper control system an optical detection method can tolerate more interference. Therefore, the present disclosure further provides a windshield wiper controller, an optical raindrop detector (FIGS. 1A and 1B) and a detection method thereof (FIGS. 4A and 5) that may be configured to detect the spot or water attached to the windshield and raindrops in front of the windshield simultaneously to accordingly control a wiping speed and/or a wiping frequency of a wiper according to current rain intensity. In addition, the present disclosure may eliminate the interference from ambient light by calculating differential images so as to improve the control accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical raindrop detector, comprising:
   a light source;
   a light control unit configured to control the light source to emit light with a first brightness value and a second brightness value;
   a light guide comprising an incident surface, a detection surface and an ejection surface, wherein the light source is configured to emit incident light into the light guide via the incident surface and a plurality of microstructures are formed on the ejection surface configured to reflect the incident light to become scattered light toward the detection surface;
   an image sensor configured to receive reflected light formed by raindrops in front of the detection surface reflecting the scattered light to penetrate the light guide and eject from the ejection surface, and to generate a first image frame corresponding to the first brightness value and a second image frame corresponding to the second brightness value; and
   a processing unit configured to calculate a differential image of the first image frame and the second image frame and to identify rain intensity according to the differential image.

2. The optical raindrop detector as claimed in claim 1, wherein the second brightness value is zero brightness or non-zero brightness and the second brightness value is smaller than the first brightness value.

3. The optical raindrop detector as claimed in claim 1, wherein the processing unit is further configured to calculate a pixel number of pixels having intensity values larger than an intensity threshold in the differential image and calculate a variation value of the pixel number in successive differential images.

4. The optical raindrop detector as claimed in claim 1, wherein the processing unit is further configured to determine the rain intensity according to a sum or an average of the variation value of a predetermined number of the differential images.

5. The optical raindrop detector as claimed in claim 1, wherein the processing unit is further configured to calculate a total pixel area of pixels having intensity values larger than an intensity threshold in the differential image and determine the rain intensity according to a sum or an average of the total pixel area of a predetermined number of the differential images.

6. The optical raindrop detector as claimed in claim 1, wherein the processing unit is further configured to output a wiper speed signal according to the rain intensity.

7. The optical raindrop detector as claimed in claim 1, wherein the processing unit is further configured to calculate a fixed object area of pixels having intensity values larger than an intensity threshold in the differential image and output a wiper trigger signal when the fixed object area is larger than an area threshold.

8. A windshield wiper controller, adapted to be disposed on an inner surface of a windshield, the windshield wiper controller comprising:
   a light source;
   a light control unit configured to control the light source to emit light with a first brightness value and a second brightness value;
   a light guide comprising an incident surface, a detection surface and an ejection surface, wherein the detection surface is configured to be attached to the inner surface, and the light source is configured to emit incident light into the light guide via the incident surface and a plurality of microstructures are formed on the ejection surface configured to reflect the incident light to become scattered light toward the detection surface;
   an image sensor configured to receive reflected light formed by raindrops outside the windshield reflecting the scattered light to penetrate the light guide and eject from the ejection surface and to generate a first image frame corresponding to the first brightness value and a second image frame corresponding to the second brightness value;
   a processing unit configured to calculate a differential image of the first image frame and the second image frame and to output a wiper control signal according to the differential image; and
   a control unit configured to control a wiper according to the wiper control signal.

9. The windshield wiper controller as claimed in claim 8, wherein the second brightness value is zero brightness or non-zero brightness and the second brightness value is smaller than the first brightness value.

10. The windshield wiper controller as claimed in claim 8, wherein the wiper control signal comprises a wiper speed signal and a wiper trigger signal.

11. The windshield wiper controller as claimed in claim 10, wherein the processing unit is further configured to calculate a pixel number of pixels having intensity values larger than an intensity threshold in the differential image and calculate a variation value of the pixel number in successive differential images.

12. The windshield wiper controller as claimed in claim 11, wherein the processing unit is configured to determine the wiper speed signal according to a sum or an average of the variation value of a predetermined number of the differential images.

13. The windshield wiper controller as claimed in claim 10, wherein the processing unit is further configured to calculate a total pixel area of pixels having intensity values larger than an intensity threshold in the differential image and determine the wiper speed signal according to a sum or an average of the total pixel area of a predetermined number of the differential images.

14. The windshield wiper controller as claimed in claim 10, wherein the processing unit is further configured to calculate a fixed object area of pixels having intensity values larger than an intensity threshold in the differential image and output the wiper trigger signal when the fixed object area is larger than an area threshold.

15. A detection method of an optical raindrop detector, the optical raindrop detector comprising a light source, a light guide, an image sensor and a processing unit, the light guide comprising an incident surface, a detection surface and an ejection surface, a plurality of microstructures being formed on the ejection surface, the detection method comprising:
   controlling the light source to emit light with a first brightness value and a second brightness value;
   using the image sensor to capture, at a sampling frequency, reflected light formed by raindrops in front of the detection surface reflecting scattered light, which is formed by the microstructures reflecting incident light emitted by the light source into the light guide and ejecting from the detection surface, to penetrate the light guide and eject from the ejection surface to generate a first image frame corresponding to the first brightness value and a second image frame corresponding to the second brightness value;
   using the processing unit to calculate a differential image of the first image frame and the second image frame; and
   using the processing unit to compare the differential image with an intensity threshold to identify rain intensity.

16. The detection method as claimed in claim 15, wherein the second brightness value is zero brightness or non-zero brightness and the second brightness value is smaller than the first brightness value.

17. The detection method as claimed in claim 15, wherein the step of using the processing unit to identify the rain intensity further comprises:
   calculating a pixel number of pixels having intensity values larger than an intensity threshold in the differential image;
   calculating a variation value of the pixel number in successive differential images; and
   determining the rain intensity according to a sum or an average of the variation value of a predetermined number of the differential images.

18. The detection method as claimed in claim 15, wherein the step of using the processing unit to identify the rain intensity further comprises:
   calculating a total pixel area of pixels having intensity values larger than an intensity threshold in the differential image and determining the rain intensity according to a sum or an average of the total pixel area of a predetermined number of the differential images.

19. The detection method as claimed in claim 15, further comprising:
   outputting a wiper speed signal according to the rain intensity from the processing unit.

20. The detection method as claimed in claim 15, further comprising:
   using the processing unit to calculate a fixed object area of pixels having intensity values larger than an intensity threshold in the differential image and to output a wiper trigger signal when the fixed object area is larger than an area threshold.

* * * * *